UNITED STATES PATENT OFFICE.

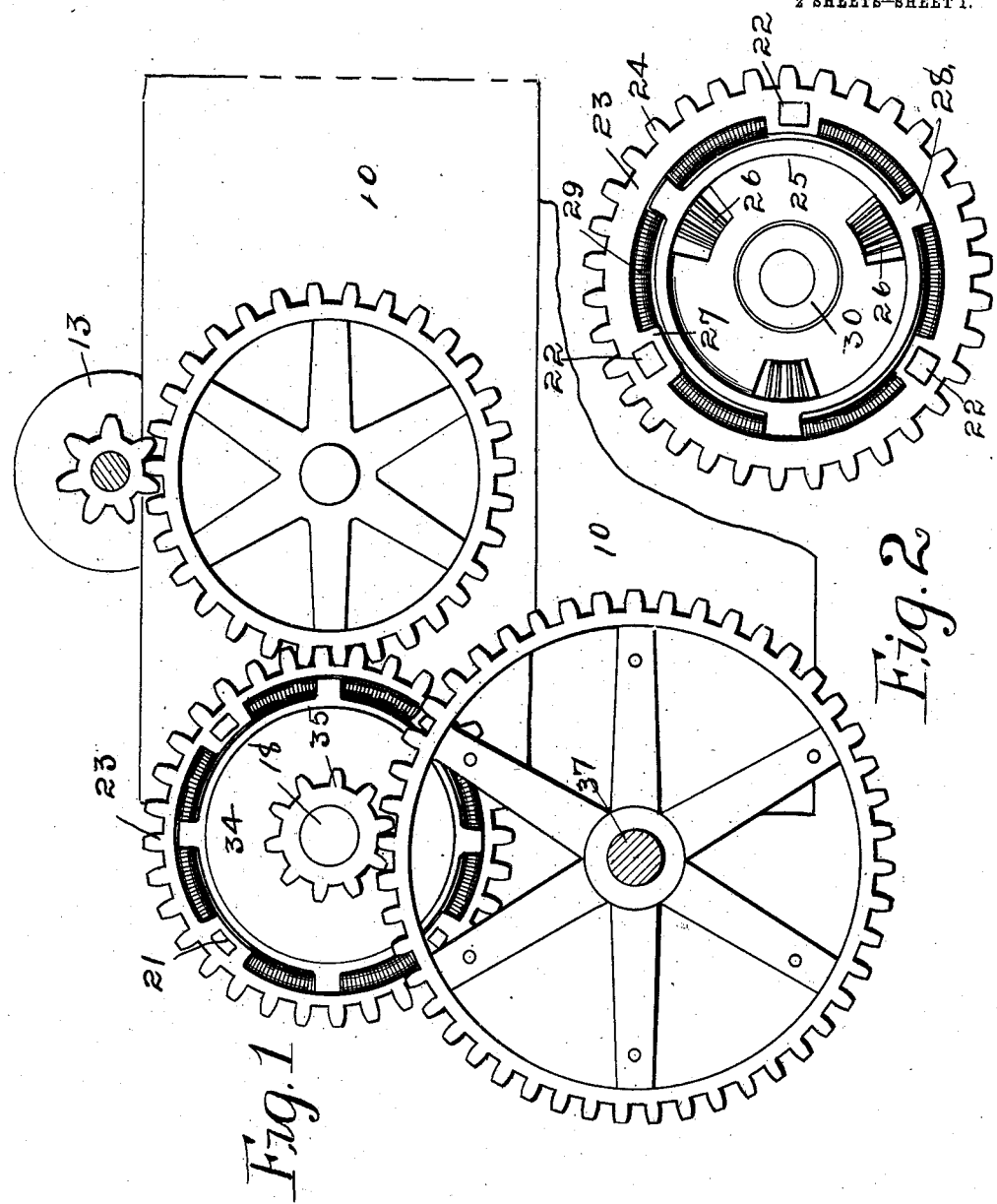

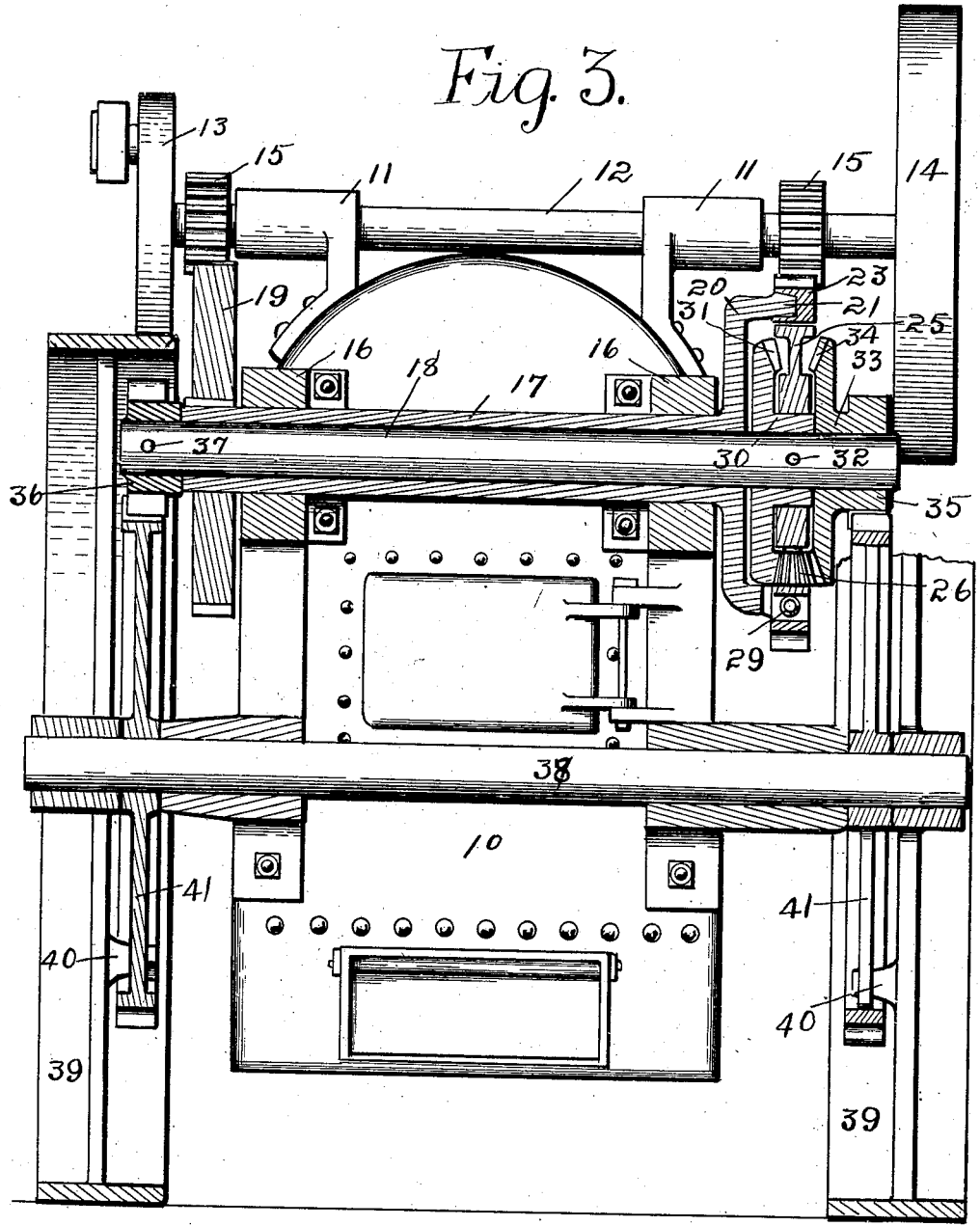

FRANZ J. WOOD, OF DES MOINES, IOWA.

DRIVING-GEAR FOR TRACTION-ENGINES.

978,977.  Specification of Letters Patent.  Patented Dec. 20, 1910.

Application filed June 1, 1909. Serial No. 499,302.

*To all whom it may concern:*

Be it known that I, FRANZ J. WOOD, a citizen of the United States, residing at Des Moines, in the county of Polk and State of Iowa, have invented a certain new and useful Driving-Gear for Traction-Engines, of which the following is a specification.

In traction engines the gearing devices are ordinarily quite heavy and the gear wheels provided with broad faces. It is also customary to mount the gearing devices upon the boiler or fire box of the traction engine. Ordinarily the power for driving both traction wheels is transmitted from a gear wheel on one end only of the main shaft.

My object is to provide a gearing device of simple, durable and inexpensive construction in which the power is transmitted to the traction wheels by means of gear wheels on both ends of the main driving shaft to thereby provide a device in which the strains upon the main driving shaft and the counter-shaft and the rear axle are all evenly distributed at both ends of said shafts to thereby avoid side strains upon the boiler and also for the purpose of permitting the use of cog wheels with comparatively narrow faces, as the distribution of the strains upon the cog wheels is equal on gearing devices on both ends of the various shafts and axles.

A further object is to provide improved and simplified means for transmitting the power from the main shaft to the driving axle through the differential gearing device in such a manner as to prevent lateral strains upon the counter-shaft on which the differential gear is mounted.

My invention consists in the construction, arrangement, combination of the various parts of the device whereby the objects contemplated are attained, as hereinafter more fully set forth, pointed out in my claims, and illustrated in the accompanying drawings, in which—

Figure 1 shows a side elevation of a part of a traction engine boiler and fire box, and my improved gearing device applied thereto and to the rear axle. Fig. 2 shows a side elevation of the differential gear with one of the beveled gear wheels removed, and Fig. 3 shows a vertical, transverse, sectional view of a traction engine embodying my invention, taken in the rear of the fire box and boiler and taken through the driving axle and the counter-shaft.

Referring to the accompanying drawings, I have used the reference numeral 10 to indicate that portion of the boiler and fire box shown.

Mounted on top of the boiler are the bearings 11 in which the main driving shaft 12 is rotatably mounted. This is provided on one end with a crank wheel 13, and on its other end with a balance wheel 14. Fixed to said shaft 12 adjacent to the outer ends of the bearings 11 are the small cog wheels 15.

Mounted on the rear of the boiler and fire box are the bearings 16 in which is rotatably mounted a sleeve 17, and within the sleeve is a counter-shaft 18. Keyed to the left end of the sleeve 17 is a large cog wheel 19 in mesh with the small cog wheel 15, and formed on or fixed to the right end of the sleeve 17 is a disk 20 having lateral extensions 21 thereon. These lateral extensions are fitted into suitable openings 22 in a rim 23 having gear teeth 24 on its periphery, the latter being in mesh with the cog wheel 15 on the right hand of the main shaft 12. Within the rim 23 is a disk 25 having a number of radially extended beveled pinions 26.

I provide a yielding connection between the disk 25 and the rim 23, as follows: On the rim 23 are a number of inwardly extended lugs 27 and on the disk 25 are a number of outwardly extended lugs 28, and a series of expansible coil springs 29 are interposed between said lugs, as clearly shown in Fig. 2, so that the disk 25 may move slightly in a rotary direction relative to the rim 23 against the pressure of said springs so that said springs serve the function of cushions to take up the strains and jars occasioned by the transmission of power from the rim 23 to the disk 25.

Mounted upon the counter-shaft 17 adjacent to its right end, is a hub 30 having a beveled pinion 31 thereon designed to mesh with the beveled pinions 26. This hub is fixed to the counter-shaft 18 by means of the pin 32. Rotatably mounted upon the shaft 18 adjacent to the hub 30 is a hub 33 having a beveled pinion 34 thereon designed to mesh with the pinions 26 and also having a gear wheel 35 thereon. On the left end of the counter-shaft 18 is a gear wheel 36 fixed to the shaft 18 by means of the pin 37.

The axle of the supporting wheels is indicated by the numeral 38 and is formed complete in one piece, and has rotatably mounted on to its ends, the traction wheels 39.

These traction wheels are provided with lugs 40, and mounted upon the axle 38 adjacent to each traction wheel is a large cog wheel 41 having the lugs 40 extended through between the spokes of the gear wheels 41 so that the said traction wheels will be driven in unison with said gear wheels. Said gear wheels are in mesh with the gear wheels 36 and 35.

In practical use, it is obvious that there will be no unequal strain upon the main driving shaft 12 for the reason that the small cog wheels 15 are placed on opposite ends thereof and are in mesh with the cog wheels 19 and 23, which are both fixed to the sleeve 17, hence the bearings that support said shaft 12 and the sleeve 17 may be made comparatively light for the reason that the strains upon both ends thereof will be the same. This will tend to prolong the life of said cog wheels as the shafts may be kept in alinement much easier than if there were gear wheels on one end only of said shaft and sleeve. The power thus transmitted to the sleeve 17 will be transmitted to the disk 25 through the medium of the cushioning springs 29 and the power applied to the disks 25 will be distributed to the beveled gear wheels 31 and 34 in equal amounts, thus applying a driving motion to the small gear wheels 35 and 36 which are in mesh with the large gear wheels 41 on the traction wheels. By means of the differential gearing device, the traction engine may be moved in a circle with one traction wheel moving faster than the other and the same amount of power will be applied to both traction wheels in the well known manner of the operation of differential gearing devices.

The gear wheels used in connection with traction engines in which only one gear wheel is used on the main driving shaft are usually made with very broad faces, and inasmuch as these gear wheels are usually made by a casting process, the teeth must be slightly tapered in order to permit the castings to draw from the sand, therefore, the teeth must be slightly wider at one side than at the other. By using two gear wheels on opposite ends of the main driving shaft, I am enabled to employ gear wheels of much less width, and hence said wheels may be readily and easily made by a casting process with only a comparatively slight amount of variation of the width of the teeth at the opposite sides of the gear wheel. Furthermore, by having gear wheels on both ends of the main driving shaft and on both ends of the sleeve on the counter-shaft, the strains applied to both ends of the said shaft and sleeve are equal and by this means the cog wheels may be retained in parallel positions with each other with the cog teeth in the best position of adjustment relative to each other for effective work. Furthermore, by having the differential gearing device arranged on a counter-shaft, I am enabled to employ a single solid axle for the traction wheels. This is of great importance in connection with traction engines on account of the great weight carried by them which makes it impracticable to use a differential gear device on the main axle itself. In this connection it is obvious that the best possible construction in regard to the traction wheels and axle is a single axle with the traction wheels rotatably mounted on it. By my improved construction, I am enabled to attain this desirable feature and thus make an inexpensive and durable support for the traction wheels and at the same time independently drive the two traction wheels by the use of a single differential gearing device.

I claim as my invention.

1. A gearing device of the class described, comprising a power shaft, two cog wheels fixed to opposite ends thereof, a counter-shaft, a sleeve mounted on the counter-shaft, two gear wheels fixed to opposite ends of the sleeve and in mesh with the aforesaid gear wheels, two traction wheels, a gear wheel connected with each traction wheel, a gear wheel fixed to one end of the counter-shaft and in mesh with one of the gear wheels on the traction wheel, a gear wheel loose on the counter-shaft and in mesh with the other gear wheel of the traction wheel, and a differential gear interposed between the counter-shaft and the loose gear wheel thereon.

2. A gearing device for traction engines, comprising a power shaft mounted on the traction engine boiler, two gear wheels on opposite ends thereof, a counter-shaft, a sleeve on the counter-shaft, bearings on the traction engine boiler to support said sleeve, two gear wheels fixed to opposite ends of the sleeve and in mesh with the gear wheels on the power shaft, a disk within one of said gear wheels on the sleeve, cushioning springs interposed between the said gear wheel and disk, beveled pinions carried by said disk, a beveled gear wheel fixed to the counter-shaft and in mesh with said pinions, a second beveled gear wheel loose on the counter-shaft and in mesh with said pinions, a gear wheel fixed to the latter beveled gear wheel, a gear wheel fixed to the end of the counter-shaft opposite from the loose gear wheel, an axle fixed to the traction engine boiler, traction wheels rotatably mounted on opposite ends thereof, a gear wheel fixed to each traction wheel and in mesh with the gear wheels on the counter-shaft, for the purposes stated.

Des Moines, Iowa, May 13, 1909.

FRANZ J. WOOD.

Witnesses:
  MILDRED B. GOLDIZEN,
  NELLIE M. TAYLOR.